123,479

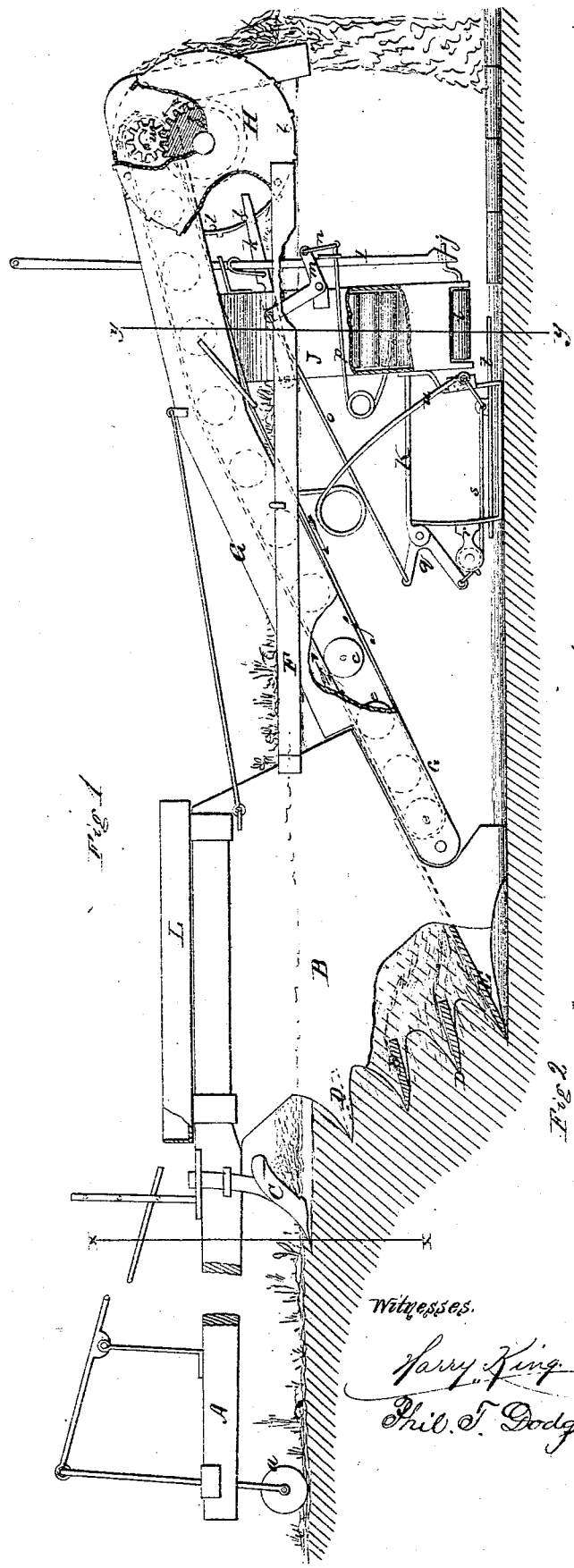
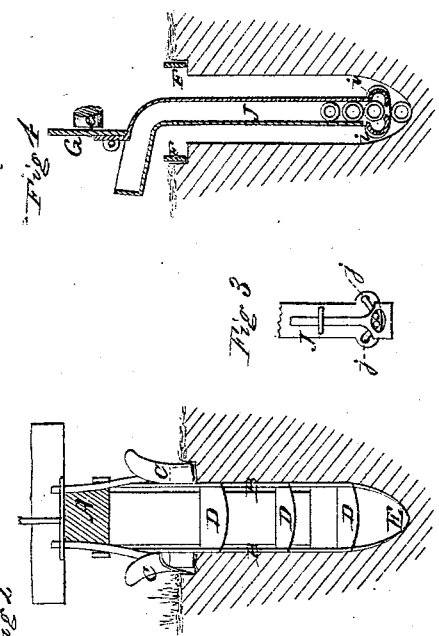
M. M. HOOTON.
Ditching and Tile Laying Machine.
No. 123,479.
Patented Feb. 6, 1872.

UNITED STATES PATENT OFFICE.

MARSENA M. HOOTON, OF CENTRALIA, ILLINOIS.

IMPROVEMENT IN DITCHING AND TILE-LAYING MACHINES.

Specification forming part of Letters Patent No. 123,479, dated February 6, 1872; antedated January 22, 1872.

SPECIFICATION.

*To all whom it may concern:*

Be it known that I, MARSENA M. HOOTON, of Centralia, in the county of Marion and State of Illinois, have invented certain Improvements in Ditching and Tile-Laying Machines, of which the following is a specification, reference being had to the accompanying drawing.

My invention consists in a novel combination and arrangement of devices for opening a ditch, laying tile therein, and covering the tile thus laid, as hereinafter described.

Figure 1 is a side elevation of my machine in operation, certain portions being broken away to show the interior. Fig. 2 is a cross-section of the same on the line $x\, x$. Fig. 3 is a rear view of a portion of the tile-dropper; and Fig. 4, a cross-section of the machine on the line $y\, y$ of Fig. 1.

In constructing my machine I first provide a beam, A, and support its front end on a wheel, $a$, and secure to its rear end two parallel vertical plates, B, sharpened at their front edges, and connected together at their lower edges. Between the front edges of the plates B I secure three or more knives, D, each a little in advance of the one next below; and below these short knives I secure a long inclined knife, E, the forward end of which is of a V-form, and lies in line with the lower edges of plates B, as shown in Figs. 1 and 2. To each side of the beam A, forward of the plates B, I attach a plow, C; and to each plate B I secure the forward end of a long horizontal bar or arm, F, as shown in Figs. 1 and 4. When the beam A is drawn forward, the plates B enter the ground, and, in connection with the knives D and E, cut a ditch or furrow, the earth being cut loose on the sides by plates B, and then sliced and broken up by the knives D and E, the latter serving to form a V-shaped bottom to the ditch. The roller $a$ runs on the surface of the ground and supports the beam, while the plows C open a wide, shallow furrow, in which the arms F slide, for the double purpose of supporting and guiding the plates B, and of preventing loose earth from falling into the ditch, as well as to provide a smooth surface or way for the drive-wheels to run on. To the lower rear corners of the plates B I hinge the forward end of a frame, G, the rear end of which I support by two wheels, H, arranged to run in the shallow plow-furrow after the arms F. In the frame G, on a series of transverse rollers, $e$, I mount an endless apron, $f$, extending from the rear end of knife E upward and backward between wheels H, as shown. The belt I operate by providing its rear roller with a pinion, $w$, and one of wheels H with a wheel, $z$, gearing therein, as shown in Fig. 1, so that as the wheels H turn forward the apron is turned backward. As the machine advances, the earth loosened by the plates B and knives passes up knife E onto the apron, by which it is carried up backward between the wheels and again discharged into the ditch, as shown. Thus it will be seen that a ditch is being opened ahead of the machine and closed again after it, an open space remaining all the while under the frame G, as shown. To the under side of frame G I secure an upright tube or box, J, so as to travel in the open portion of the ditch. This tube I make of the proper size to hold the tiles when lying on their sides above one another, as shown in Figs 1 and 4, and with its lower end near the bottom of the ditch, and its upper end curved out on one side to permit the introduction of the tiles. To the lower end of the tube J I pivot two parallel concave plates, $i$, and provide them each with a crank, $j$, at one end; and on the rear side of the tube I mount a vertical sliding rod, I, having in its lower end a slot, in which the cranks $j$ play, as shown in Figs. 1 and 3, so that by moving said rod the plates $i$ may be turned so as to bring their upper or their lower edges in contact. The rod I is raised by a spring, $p$, and depressed by a lever, $k$, which is connected to it by a link, the lever being operated by pins $l$ on one of the wheels H, which strike the lever in succession as the wheel revolves. When the rod I is up, the lower edges of the two plates $i$ are in contact, and the bottom tile in the tube rests upon them, as in Fig. 4; but when the rod is depressed, the lower edges of the plates are moved apart and the tile permitted to drop into the furrow, the upper edges of the plates being at the same time closed together so as to prevent the tiles above from dropping down. When the rod is again raised, the plates are turned back to their first position, and another tile allowed to drop down and rest between them, and so on continuously. By the above-described arrangement of devices, it will be seen that each time a pin, $l$, presses the lever $k$ a tile is dropped into the ditch. The bottom of the ditch being V-shaped, the tiles, when deposited therein, roll down to the middle in line with each other; but, for the purpose of shoving their ends up close together, I provide a sliding rod, $s$, mounted in a frame, K, attached to tube J, as shown in Fig. 1. To this rod I connect a spring, $u$, which tends to slide the rod backward. I also connect the rod by a cord, $s$, with one arm of an elbow-lever, $q$, pivoted to frame K, the other arm of said lever being connected by a rod, $o$, with a second elbow-lever, $m$, which is pivoted to the upper part of tube J, and connected by a link, $n$, with rod I, as shown in Fig. 1. When rod I is depressed, the rod $t$ is drawn forward and a tile dropped into the ditch behind it; and when the rod I is raised by the spring $p$, the rod $t$ is forced back by spring $u$ against the tile so as to force the same up against the one next behind. On top of the cutting-plates B I mount a box or tray, L, to contain a supply of tiles, which are thus carried along with the machine. The tiles carried in this manner also serve as a weight to force the plates B down into the ground.

The various parts being constructed and arranged as described, it will be seen that as the machine is drawn forward a ditch is opened at the front of the same, the tiles automatically laid in said ditch, and then the tiles covered with earth. If desired, the pins $l$ may be made detachable, so that they can be placed at any desired distance apart, and thus the lever $k$ operated at longer or shorter intervals, according to the length of the tiles used.

The depth of the ditch formed by the machine is regulated by adjusting the plows C and the roller $a$, as the latter supports directly the front of the machine, while the former prepare the way or surface for the wheels and arms which support the rear end.

Having thus described my invention, what I claim is—

1. In a ditching-machine, the plates B and knives D and E, when constructed and arranged to operate as herein described.

2. In combination with the ditching and tile-laying machine, constructed substantially as described, the adjustable plows C C, when arranged to operate as and for the purpose set forth.

3. In combination with the knives D and E, the endless belt or apron $f$, when arranged to operate as described, for the purpose of receiving the earth as the ditch is cut, and filling said ditch as the machine advances, as set forth.

4. The tube J, with the pivoted concave plates $i\ i$, in combination with rod $z$, spring $p$, and lever $k$, when constructed and arranged to be operated as described, for the purpose of laying the tile, as set forth.

5. The rod $t$, in connection with spring $u$, rod I, and the intervening mechanical devices described, for the purpose of driving the tile, when laid, together, as set forth.

6. The arms or fenders F, when arranged on each side of the machine, as described, for the purpose of keeping the excavation clear.

MARSENA M. HOOTON.

Witnesses:
  WM. E. BOTTS,
  JOHN W. WRIGHT.